United States Patent [19]

Compton et al.

[11] Patent Number: 4,624,291
[45] Date of Patent: * Nov. 25, 1986

[54] METHOD OF PREFILLING MODULAR HYDRAULIC CONTROL APPARATUS

[75] Inventors: David J. Compton, Troy; Richard A. Nix, Utica; Keith V. Leigh-Monstevens, Troy, all of Mich.

[73] Assignee: Automotive Products plc, Warwickshire, England

[*] Notice: The portion of the term of this patent subsequent to Aug. 26, 2003 has been disclaimed.

[21] Appl. No.: 680,329

[22] Filed: Dec. 10, 1984

Related U.S. Application Data

[63] Continuation-in-part of Ser. No. 607,020, Apr. 30, 1984, which is a continuation-in-part of Ser. No. 555,667, Nov. 28, 1983.

[51] Int. Cl.⁴ ................................................. B65B 3/04
[52] U.S. Cl. .......................................... 141/1; 141/83; 141/98; 141/392; 60/584; 60/592; 24/16 PB; 24/17 AP; 92/15; 92/23; 137/852; 137/854; 188/352; 303/64
[58] Field of Search ............ 24/16 PB, 17 AP; 403/2; 215/250; 220/89 A, 265; 137/68 R, 68 A, 70, 71, 854; 92/15, 23; 60/635, 636, 584, 585, 592; 141/1-12, 83, 98, 392; 188/352; 303/56-63

[56] References Cited

U.S. PATENT DOCUMENTS

4,454,632 6/1984 Nix et al. ............................. 60/684

Primary Examiner—Houston S. Bell, Jr.
Attorney, Agent, or Firm—Hauke and Patalidis

[57] ABSTRACT

A hydraulic control apparatus, more particularly for operating a motor vehicle clutch release mechanism, comprising a master cylinder, a slave cylinder and a conduit connecting the master cylinder to the slave cylinder. The apparatus is in the form of separate modular units which are separately, but simultaneously, filled with hydraulic fluid after simultaneous evacuation of atmospheric air from the apparatus modular units and test of the integrity of the modular units, and the pretested and prefilled modular units are shipped unconnected to a user. Each modular unit is provided with a leakproof quick-connect connector member, through which filling of the modular unit may be effected, and which mates with a complementary leakproof quick-connect connector member of another modular unit, such that after installation on a utilization device, a motor vehicle for example, complementary connector members are reconnected, thus opening ports in each connector member placing each member in fluid communication with the other. Preferably, the two connector members are provided with a one-way locking arrangement preventing separation of the connector members after coupling.

3 Claims, 9 Drawing Figures

METHOD OF PREFILLING MODULAR HYDRAULIC CONTROL APPARATUS

CROSS-REFERENCE TO RELATED APPLICATIONS

The present application is a continuation-in-part of application Ser. No. 607,020 filed Apr. 30, 1984, which is a continuation-in-part of application Ser. No. 555,667, filed Nov. 28, 1983, all assigned to the same assignee as the present application.

BACKGROUND OF THE INVENTION

The present invention relates to hydraulic apparatus in general, and more particularly to a hydraulic control apparatus comprising a hydraulic master cylinder and a hydraulic slave cylinder for operating a mechanism remotely located from the master cylinder, the hydraulic control apparatus being prefilled with hydraulic fluid and pretested prior to shipment to a motor vehicle manufacturer, for example for installation in a motor vehicle. The present invention also relates to the method of prefilling the hydraulic apparatus with hydraulic fluid.

It is now known to prefill with hydraulic fluid a motor vehicle clutch control apparatus, comprising a master cylinder, a reservoir of hydraulic fluid, and a slave cylinder for operating the throwout bearing of a mechanical diaphragm spring clutch, as disclosed in British Pat. No. 1,539,879 and in corresponding U.S. Pat. No. 4,407,125, and in co-pending application Ser. No. 376,248, now abandoned, and assigned to the same assignee as the present application. In addition, U.S. Pat. Nos. 4,503,678 and 4,506,507 and co-pending application Ser. Nos. 477,159 (now U.S. Pat. No. 4,585,106), 477,160 (now U.S. Pat. No. 4,585,107), 477,161 (now U.S. Pat. No. 4,585,108), 477,162 (now U.S. Pat. No. 4,585,109), all filed Mar. 21, 1983 and 555,667 (filed on Nov. 28, 1983) and 607,020 (filed on Aug. 30, 1984), all assigned to the same assignee as the present application, also disclose diverse forms of prefilled hydraulic control apparatus for motor vehicle clutches, and co-pending application Ser. Nos. 555,666 and 555,668 filed Nov. 28, 1983, and assigned to the same assignee as the present application disclose prefilled hydraulic control apparatus for transmission shifting mechanisms and throttle mechanisms, respectively.

Prefilling with hydraulic fluid and pretesting hydraulic apparatus for operating motor vehicle mechanisms such as mechanical clutches present the many advantages, for the motor vehicle manufacturer, of receiving a fully assembled mechanism comprising all the components filled with hydraulic fluid and pretested for proper operation, ready to install on a motor vehicle on the assembly line, without requiring that the components be installed separately, connected by way of a flexible conduit, and filled after installation with hydraulic fluid while being purged of any atmospheric air contained in the apparatus.

In apparatus wherein the sleeve cylinder, actuating the clutch release mechanism, takes the form of a conventional cylindrical cylinder-piston assembly with the piston rod projecting from the cylinder housing attached at its end to the clutch release lever, the slave cylinder being attached at some portion of the clutch bell housing, permanent connection of the master cylinder to the slave cylinder by means of a flexible conduit, and prefill of the apparatus with hydraulic fluid do not present much inconvenience, whether the slave cylinder or the master cylinder is installed first on the vehicle, and the other cylinder installed at some other subsequent station on the assembly line. The last installed component may be simply left dangling on the end of the flexible conduit, or may be attached by means of straps, wires or strings to some portion of the motor vehicle frame or body, until definitely mounted in its operative position. However, with the present trend towards utilizing annular slave cylinders, disposed concentric to the driveshaft and bolted either to the face of the transmission or gearbox casing or, in the alternative, mounted on or made integral with the clutch bell housing, such that the annular piston within the concentric annular slave cylinder may operate the clutch throwout bearing, it is difficult to provide a fully assembled, fully tested, prefilled apparatus, without some accompanying inconveniences. Such inconveniences relate to the requirement that the annular slave cylinder be installed first in the clutch bell housing, or on the transmission casing face, and the master cylinder on the end of the flexible line or conduit interconnecting the master and slave cylinders be provisionally attached, in some manner by strings, wires or straps to the motor vehicle frame, and subsequently installed in its proper position through the passenger compartment floorboard or bulkhead.

The inventions disclosed in application Ser. Nos. 555,667 and 607,020 remedy the inconvenience enumerated hereinbefore with respect to preassembled prefilled hydraulic control apparatus for motor vehicle mechanical clutches, more particularly in structures wherein the throwout bearing is operated by a concentric annular slave cylinder, while presenting all the advantages of prefilled and pretested clutch control apparatus. Such results are achieved by a pretested prefilled hydraulic clutch control mechanism provided with an irreversible one-way quick-connect fitting or connector either at some point of the flexible conduit connecting the master cylinder to the slave cylinder, or at the end of the conduit connected to the master cylinder, or at the end of the conduit connected to the slave cylinder. The one-way quick-connect fitting or connector is arranged such that after the hydraulic control mechanism has been assembled, prefilled with hydraulic fluid and pretested, the connection between the master cylinder and the slave cylinder may be broken, without loss of fluid, or negligible loss of fluid, and the apparatus may be shipped to the motor vehicle manufacturer, completely filled with hydraulic fluid but in two separate portions such that the concentric slave cylinder may be made a part of the clutch bell housing, or of the transmission casing, and thus installed in the motor vehicle at whatever station on the assembly line that the clutch or transmission is installed, and such that the master cylinder may be installed in the motor vehicle also at whatever appropriate station, and the two connected together without any loss, or negligible loss, of fluid and without introduction of air into the apparatus.

SUMMARY OF THE INVENTION

The present invention also has for principal object to provide a prefilled hydraulic clutch control mechanism provided with a one-way quick connect fitting or connector between the master cylinder and the slave cylinder. The one-way quick-connect fitting or connector may be disposed at either end of the flexible line or conduit connecting the master cylinder to the slave cylinder, or may be disposed at some intermediary point between the ends of the flexible conduit. The one-way quick connect fitting or connector is made of two half-connectors, a female member and a male member which, once coupled, cannot be uncoupled. In the alternative, where it is desired to enable the quick-connect fitting or connector halves to be uncoupled for the purpose of part replacement or repair, they can be uncoupled only by means of a special tool.

The present invention, as the one disclosed in copending application Ser. Nos. 555,667 and 607,020, permits to assemble a hydraulic control apparatus, prefill it with hydraulic fluid and pretest it. After this has been accomplished, the connection between the master cylinder and the slave cylinder may be broken, without loss of fluid, or negligible loss of fluid, and the apparatus may be shipped to a motor vehicle manufacturer, completely filled with hydraulic fluid but in two or three separate portions, such that the slave cylinder may be made a part of the clutch bell housing, or the transmission casing, and thus installed in the motor vehicle at whatever convenient station on the assembly line that the clutch or transmission is installed, and such that the master cylinder may be installed in the motor vehicle at whatever appropriate station of the assembly line, and the two connected together without any loss of fluid and without the introduction of air into the apparatus. In addition, the present invention permits to prefill the hydraulic control apparatus in its separate portions in a single operation, and to connect the portions on the assembly line without loss of fluid and without introduction of air into the apparatus, thus doing away with the requirement of filling the apparatus with hydraulic fluid and appropriately bleeding the apparatus after installation on a motor vehicle on the assembly line. Furthermore, the present invention permits to effectuate any repair on the motor vehicle requiring disconnecting the master cylinder from the slave cylinder, such as for example effecting repairs on the engine, on the clutch or on the transmission, which may require removal of a component from the motor vehicle and disconnecting the slave cylinder from the master cylinder especially in installations wherein the slave cylinder is an annular cylinder mounted around the motor vehicle driveshaft. As a further advantage, the present invention permits to replace one of the components of the hydraulic control apparatus without the requirement of replacing the other components and without the requirement of refilling and bleeding the whole system after replacement of a component. The present invention has many applications to other automotive mechanisms, such as hydraulic brake system, hydraulic gear shifters and hydraulic throttle controls, for example.

Other objects and advantages of the present invention will become apparent to those skilled in the art when the following description of the best modes contemplated for practicing the invention is read in conjunction with the accompanying drawing wherein like reference numerals refer to like or equivalent parts, and in which:

DETAILED DESCRIPTION OF THE PREFERRED EMBODIMENTS

Figure 1:
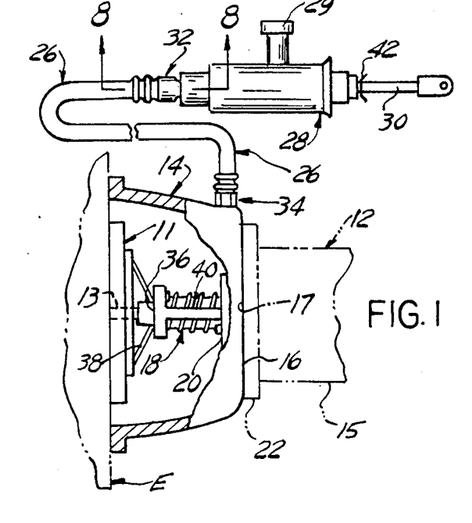
FIG. 1 is a schematic representation of a clutch hydraulic control apparatus according to the present invention.

Referring to the drawing, and more particularly to FIG. 1, a motor vehicle transmission is schematically illustrated as comprising a friction clutch assembly 11 and a gearbox 12 enclosed in a casing or housing 15. A driveshaft 13 drives the gearbox 12 from the clutch assembly 11. A bell housing 14, surrounding the clutch assembly 11, is bolted on the rear face of the motor vehicle engine E. The rear face 16 of the bell housing 14 is bolted to the face 17 of the gearbox casing 15. An annular hydraulic slave cylinder 18 is disposed around the driveshaft 13 within the bell housing 14. In the example of structure illustrated, the slave cylinder 18 has a one-piece housing 20 cast integral with the clutch bell housing 14. The face 17 of the gearbox casing 20 is on a flange 22, and an end plate, not shown, closing the end of the gearbox casing 15 is also bolted to the face 17 of the gearbox casing 15, the transmission input shaft 13, as shown in dashed lines, projecting through the end plate 24.

The slave cylinder 18 is connected via a line or conduit 26 to a master cylinder 28. The master cylinder 28 is provided with a built-in hydraulic fluid reservoir 29, in the example of structure illustrated, and has an input rod 30 pivotally connectable at an end to a clutch control pedal, not shown, installed within the driver compartment of a motor vehicle, not shown. The rod 30, as is well known, is connected to a piston, not shown, disposed in the master cylinder 28 of displacing the hydraulic fluid through the line 26 to the slave cylinder 18 when the clutch pedal is depressed. The line of conduit 26 is a flexible conduit or hose having a connector 32 for connection to the inlet of the slave connector 18, and has another connector 34 on the other end for connection to the outlet of the master cylinder 28.

Although the slave cylinder 18 is, in the illustrated example of structure, of the type having a housing 20 which is formed integral with the clutch bell housing 14, it will be appreciated that the slave cylinder may in the alternative, be formed integral with the transmission or gearbox casing end plate, as disclosed in details in application Ser. No. 537,869, filed Sept. 30, 1983 and assigned to the same assignee as the present application. In such structures, the slave cylinder 18 is already integral or preassembled to the clutch bell housing 14, as illustrated, when the bell housing is bolted to the gearbox casing 15 during assembly of a motor vehicle or, in its alternate configuration, not shown here, the slave cylinder is already preassembled to the transmission or gearbox casing 15 by being made part of the casing end plate. It will be appreciated by those skilled in the art that the invention may be used in combination with any type of concentric slave cylinder as disclosed in detail in the aforesaid co-pending application, Ser. No. 537,869, or to any hydraulic control apparatus for a motor vehicle mechanical clutch, whether utilizing a concentric slave cylinder or a more conventional cylindrical slave cylinder.

The slave cylinder 18, as disclosed in detail in the aforesaid pending application, is adapted to displace a throw-out bearing 36 engaged with the end of the clutch release fingers 38, for releasing the clutch 11 when hydraulic fluid is introduced into the slave cylinder 18 from the master cylinder 28 through the conduit 26. After manufacturing and assembly of the hydraulic apparatus, and prior to filling the apparatus with hydraulic fluid, a restraining strap 40, of the type disclosed in more details in copending application Ser. No. 537,869, for example, is installed for holding the throw-out bearing 36 in a retracted position, during shipment of the hydraulic apparatus and installation of the integral subassembly of the slave cylinder 18 and bell housing 14 on a motor vehicle, in the example of structure illustrated. During filling with hydraulic fluid of the hydraulic apparatus, and during shipment and installation of the master cylinder 28 on a motor vehicle, the input rod 30 of the master cylinder is held in an extended position by means such as a clip 42, for example, as disclosed in more detail on copending application Ser. No. 509,998, also assigned to the same assignee as the present application.

In the example of structure illustrated at FIG. 1, the fitting or connector 32, connecting an end of the conduit 26 to the master cylinder 28, is of the leakproof quick-connect type, while the fitting or connector 34 connecting the other end of the conduit 26 to the slave cylinder 18 is of the conventional type. In this manner, after the hydraulic apparatus has been filled with hydraulic fluid, the line or conduit 26 may be broken at the connector 32 without loss of hydraulic fluid or, in the alternative, and as hereinafter explained, the master cylinder 28 may be prefilled with hydraulic fluid as a separate first modular unit, while the slave cylinder 18 and the conduit 26 may be filled with hydraulic fluid as a separate second modular unit, the two separate modular units being reconnected after installation of the hydraulic apparatus on a motor vehicle.

Figure 2:
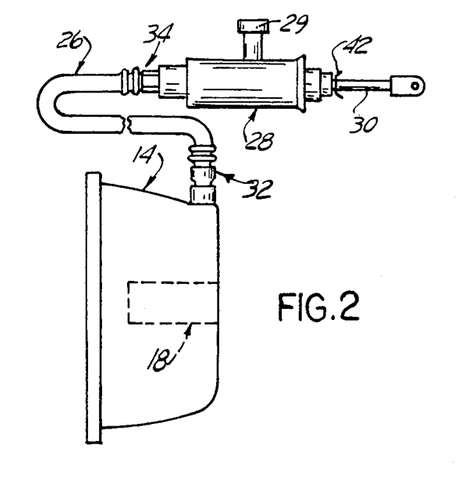
FIGS. 2 through 4 are views generally similar to FIG. 1 but showing modifications thereof.

In the example of structure of FIG. 2, the leakproof quick-connect connector 32 is used for connecting one end of the line 26 to the slave cylinder 18, while the other end of the conduit 26 connected to the master cylinder 28 is provided with a conventional connector 34. The hydraulic apparatus may thus be broken at the leakproof quick-connect connector 32, after filling and testing of the apparatus, or, in the alternative, the separate modular units consisting of the master cylinder 28 with the hose or conduit 26 attached thereto, and of the slave cylinder 18, contained within the bell housing 14, may be separately prefilled and readily connected after installation of the units on a motor vehicle.

Figure 3:
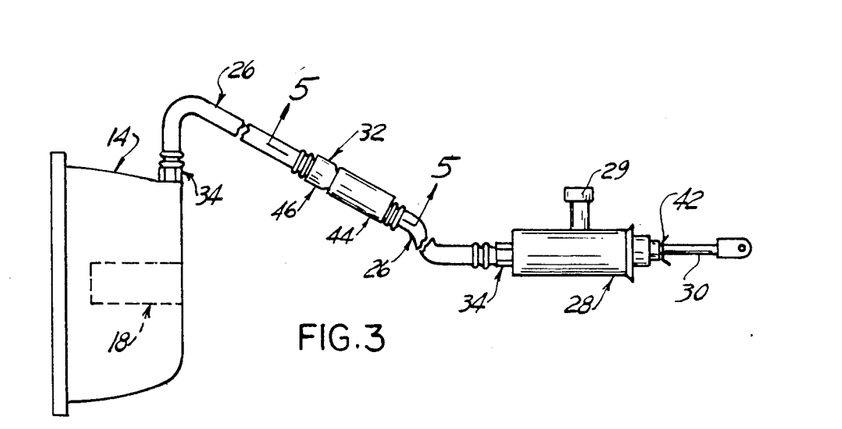

FIG. 3 illustrates a clutch hydraulic control apparatus according to the present invention wherein the conduit 26 is connected to the master cylinder 28 by way of a conventional connector 34 attached to an end of the conduit and the other end of the conduit 26 is connected to the slave cylinder 18 also by way of a conventional connector 34. At some point between the ends of the conduit 26, a leakproof quick-connect connector 32 is disposed such as to permit installing the master cylinder 28 on a motor vehicle with a portion of the conduit 26 attached thereto, and to permit installing the slave cylinder 18 on the motor vehicle already pre-installed in or made integral with the bell housing 14, in the structure illustrated, or pre-installed on, or integral with, the transmission end cover. The hydraulic apparatus may be prefilled with hydraulic fluid and pretested in the manufacturer's plant as a complete assembly, or it may be prefilled and pretested in separate modular sub-assemblies, one consisting of the slave cylinder 18 with a portion of the conduit 26 attached thereto, and the other consisting of the master cylinder 28 with the other portion of the conduit 26 attached thereto, and the connection between the ends of the portions of the conduit 26 each provided with one half of the leakproof quick-connect connector 32 is effected during assembly of the motor vehicle.

Figure 4:
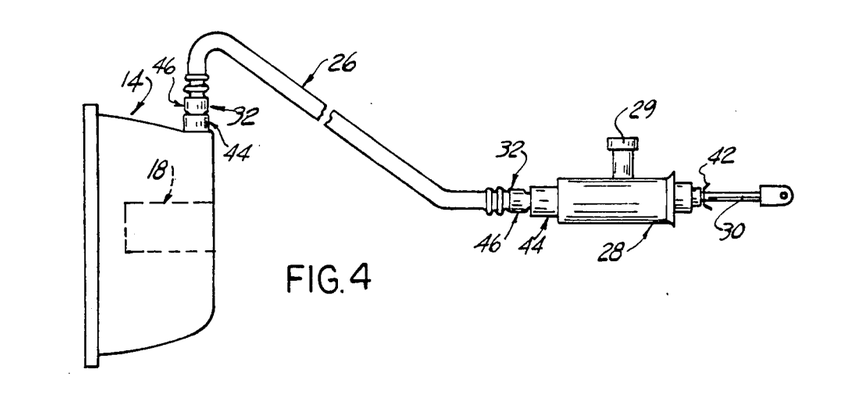

FIG. 4 illustrates an extreme arrangement for a hydraulic control apparatus according to the invention having practical applications especially in installations wherein the master cylinder 28 and the slave cylinder 18 are located at considerable distance from each other, such as for example in a rear-engine motor coach or the like, and the routing of the flexible conduit 26 through the frame or the body of the motor vehicle is more conveniently effected with the ends of the conduit 26 unattached to the master cylinder 28 and to the slave cylinder 18, respectively. The conduit 26 is provided with a leakproof quick-connect connector 32 at each end, and such an arrangement still permits to effectuate a bench filling of the apparatus with hydraulic fluid and testing of the apparatus prior to shipment to the motor vehicle manufacturer. The apparatus is subsequently broken in three separate components or modular units, already filled with hydraulic fluid, one being the master cylinder 28, the other the slave cylinder 18 and the third one the conduit 26. During assembly of the motor vehicle, the three separate components are interconnected without loss of fluid and without introduction of air in the system. Furthermore, if so desirable, the master cylinder 28, the slave cylinder 18 and the conduit 26 may be prefilled and pretested individually.

Figure 5:
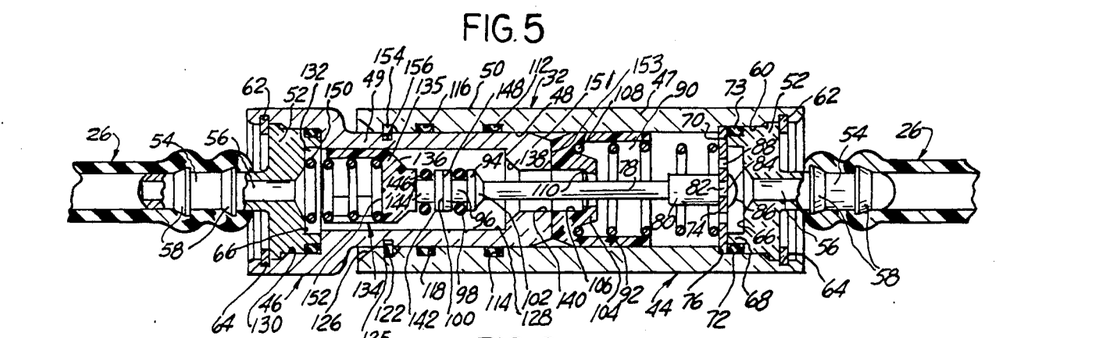
FIG. 5 is a partial section along line 5—5 of FIG. 3.
Figure 6:
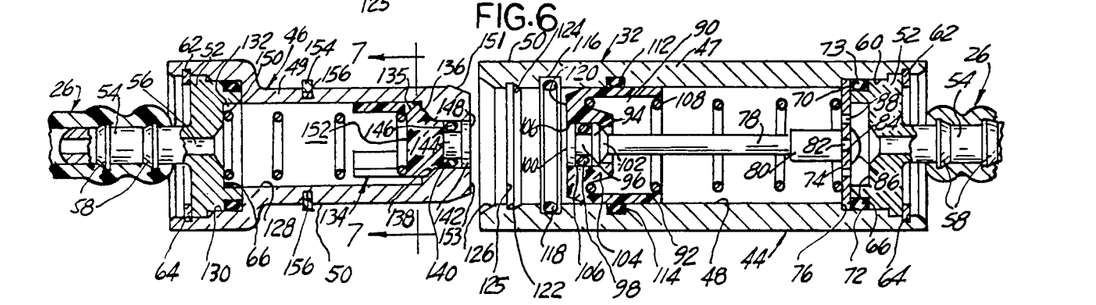
FIG. 6 is a view similar to FIG. 5, but showing the two separate halves of a leakproof quick-connect fitting or connector forming part of the present invention, prior to coupling.

As illustrated in detail at FIGS. 5 and 6, the leakproof quick-connect connector 32 of FIG. 3 consists of two complementary half-connectors or members 44 and 46, each formed of a tubular body 47 and 48, respectively. As logic indicates, the half-connector 44 is of the female type and its tubular body 47 has a bore 48 capable of slidably accepting the cylindrical peripheral surface 50 of the tubular body 49 of the half-connector 46, which is evidently of the male type. FIG. 5 illustrates the two female and male members 44 and 46 coupled, as also shown at FIG. 3, while FIG. 6 illustrates the female member 44 and the male member 46 uncoupled prior to introducing the tubular body 49 of the male member 46 into the bore 48 of the female member 44, after installation of the master cylinder 28 and of the slave cylinder 18-clutch bell housing 14 sub-assembly in their respective locations on a motor vehicle.

The tubular body 47 of the female member 44 has an end cap 52 provided with an integral outwardly projecting fitting 54, a passageway 56 permitting fluid communication with the interior of the conduit 26 having its end fitted over the fitting 54, and being adequately clamped thereon or, as illustrated, being elastically held over by means of a pair of tapered annular ridges 58 projecting from the peripheral surface of the fitting 54. The end cap 52 fits in an enlarged diameter end portion 60 of the bore 48 and is held in assembly by means of a spring steel snap-ring 62 elastically expanded in a groove 64, interiorly formed proximate the end of the tubular housing 47. The interior end face 66 of the end cap 52 is recessed as a result of being provided with an integral projecting annular ridge or rim 68 forming an end annular abutment surface 70. The annular rim 68 has an outer peripheral surface spaced from the internal surface of the enlarged diameter portion 60 of the bore 48, such as to form an L-shaped groove 72 in which is disposed an elastomeric O-ring 73. A circular plate 74 of a diameter permitting fitting thereof within the enlarged diameter portion 60 of the bore 48 is engaged on one side with the annular abutment surface 70 of the end cap 52, and on its other side with an annular shoulder 76 formed at the junction between the bore 48 of the tubular body 47 and the enlarged diameter bore portion 60 in which is fitted the end cap 52, such as to fixedly hold the circular plate 74 in position as shown. The circular plate 74 supports a rod 78 at its enlarged foot portion 80 having a mounting stem 82 passed through a central aperture 84 in the circular plate 74, the projecting end of the stem 82 being formed as a rivet head 86 for holding the rod 78 fixedly about the longitudinal axis of the bore 48. Apertures, such as shown at 88, are provided through the circular plate 74 such as to permit hydraulic fluid to circulate to and fro between the passageway 56 and a chamber 90 defined in the bore 48 of the female member 44 below a generally cup-shaped spool valve 92 slidably disposed in the bore 48. The rod 78 has an enlarged head 94 provided with a groove 96 in which is disposed an elastomeric O-ring 98. The top of the enlarged head 98 forms a circular abutment surface 100 and the bottom of the enlarged head 94 forms a tapered abutment surface 102. The valve spool 92 has an internally directed boss 104 provided with a port defined by a bore 106 capable of accepting the rod enlarged head 98 when the spool valve 92 is displaced by a compressed coil spring 108, disposed between the circular plate 74 and the cup-shaped spool valve 92, urging the spool valve 92 to the position shown at FIG. 6, causing engagement of the tapered abutment face 102 with a corresponding tapered abutment end surface 110 at the end of the bore 106 within the valve spool boss 104.

It is immediately apparent that in the position of the spool valve 92 illustrated at FIG. 6, the enlarged head 94 of the rod 78 being engaged within the port defined by the bore 106 in the spool valve boss 104, the elastomeric O-ring 98 in the groove 96 prevents leakage of fluid from the chamber 90 to the open end of the female member tubular body 47. An elastomeric O-ring 112, disposed in an annular groove 114 in the surface of the bore 48 prevents leakage of fluid past the peripheral surface of the spool valve 92, the elastomeric O-ring 74 evidentally preventing leakage of fluid past the end cap 52. The bore 48 in the female member tubular body 47 is further provided with an internal groove 116 in which is disposed an elastomeric O-ring 118, the groove 116 and the elastomeric O-ring 118 being located proximate the open end of the tubular body 47 beyond the annular end face 120 of the spool valve 92. A further annular groove 122 is formed proximate the end of the tubular body 47. The groove 122 has a tapered sidewall 124 and a radial sidewall 125, and the bore 48 gradually increases in diameter at the end of the tubular body 47, such as to form a funnel-shaped or tapered wall 126.

The tubular body 49 of the male member 46 has an internal bore 126 provided with an enlarged diameter end bore portion 130 in which is fitted an end cap 52 identical to the end cap 52 closing the end of the tubular body 47 of the female member 44. The fitting 54 of the male member end cap 52 is attached to the end of the corresponding length of conduit 26, and the passageway 56 through the fitting 54 and the end cap 52 allows transfer of hydraulic fluid to and fro between the conduit 26 and an internal chamber 132 defined in the bore 128 of the male member tubular body 50. Utilizing identical end caps 52 for the male member 46 and the female member 44 results in a considerable reduction of part inventory.

Figure 7:
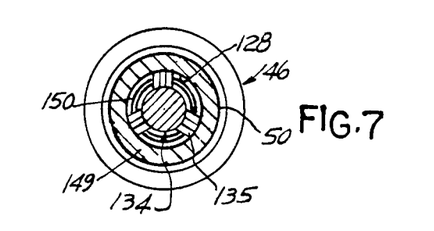
FIG. 7 is a transverse section along line 7—7 of FIG. 6.

A spider member 134 has legs 135, three in number, FIG. 7, in the example of structure illustrated, radially extending for sliding engagement with the surface of the internal bore 128 such as to provide lateral support for the spider member 134. The spider member 134 has a frontal abutment 136 engageable with an abutment annular surface 138 formed between the principal bore 128 within the tubular body 50 and a port in the form of a reduced diameter end bore portion 140. The spider member 134 supports, or is made integral with, a head or spool 142 of an outer diameter fitting the reduced diameter end bore 140, and provided with a groove 144 containing an elastomeric O-ring 146. The spool 142 has a flat abutment end face 148. A coil spring 150 disposed in compression between the annular recessed face 66 of the end cap 52 and the rear face 152 of the spider member 134 normally urges the spider member 134 and the spool 142 carried on the end thereof to the position shown at FIG. 6 wherein the spool 142 is engaged within the reduced diameter end bore 140 and the compressed O-ring 146 prevents transfer of fluid from the chamber 132 to the ambient, the abutments 136 of the spider member legs 135 in engagement with the tubular body shoulder abutment 138 limiting the forward travel of the spider member 134. The male member tubular body 49 is peripherally tapered, as shown at 151, to facilitate introduction of the male member tubular body 49 into the tapered end 126 of the bore 48 of the female member tubular body 47.

The male member tubular body 50 has an annular end face 153 which, during engagement of the male member 46 within the female member 44, engages the annular end face 120 of the cup-shaped spool valve 92 disposed within the bore 48 of the female member tubular body 47, progressively retracting the cup-shaped valve spool 92 from its position shown at FIG. 6 to the position shown at FIG. 5. During engagement of the male member 46 into the female member 44 the elastomeric O-ring 118 in the internal groove 116 in the bore 48 of the female member tubular body 47 engages the peripheral cylindrical surface 50 of the male member tubular member 49 such that when the annular end face 153 at the tip of the male tubular member 49 has retracted the valve spool 92 sufficiently as to cause the enlarged head 94 on the end of the rod 78 to be no longer disposed within the bore 106 in the valve spool 92, hydraulic fluid is allowed to circulate to and fro relative to the chamer 90 within the female member tubular body 42 and the chamber 132 within the bore 128 of the male member tubular body 49, as a result of the end face 100 of the enlarged head 94 of the rod 78 engaging the end face 148 of the spool 142 on the end of the spider member 134 causing the spool 142 and the spider member 134 to be retracted within the bore 128, and thus disengaging the spool 142 from within the reduced diameter bore 142 against the tension of the spring 150, thus opening a direct fluid communication between the chambers 90 and 132. As the male member 46 is progressively pushed into the female member 44, and the spool valve 92 is progressively retracted, the elastomeric O-ring 112 in the internal groove 114 in the bore 48 of the female member tubular body 47 elastically encircles and engages the peripheral surface 50 of the male member tubular body 49, further ensuring, in co-operation with the elastomeric O-ring 118, that no fluid leaks to the ambient.

In the coupled position illustrated at FIG. 5, a resilient snap ring 154, disposed in a peripheral groove 156 formed in the peripheral cylindrical surface 50 of the male member tubular body 49 and which has been progressively contracted while being pushed against the converging tapered entrance surface 126 of the bore 48 in the female member tubular body 47, has been allowed to expand when reaching the internal groove 122 proximate the open end of the bore 48 in the female member tubular body 47. The tapered inner wall 124 of the groove 122 aids in locating the snap ring 154 relative to the groove 122. The snap ring 154 freely expands such as to be fully engaged within the groove 122 with the trailing face of the snap ring 154, engaged in solid abutting relationship with the straight radial wall 125 of the groove 122, such that when the connector female member 44 and the connector male member 46 are coupled, as shown at FIG. 5, unauthorized separation of the two members is prevented.

For coupling the end of the conduit 26 to the master cylinder 28, FIG. 1, by means of the leakproof quick-connect connector 32, or for coupling the end of the conduit 26 to the slave cylinder 18, FIG. 2, by means of the quick-connect connector 32 or, alternatively, for connecting both ends of the conduit 26 to a respective cylinder, FIG. 3, by way of a leakproof quick-connect connector 32 on each end of the conduit 26, it is preferable to attach the connector female member 44 to the respective cylinder or to form the female member integral with the cylinder. All that is required is to provide a bore for installation therein of the rod 78 and of the spool valve 92, the bore such as bore 48 being disposed in direct communication with the internal bore 160 of the master cylinder 28, as schematically illustrated at FIG. 8, or the internal bore 48 being part of the passageway leading into the fluid chamber of the slave cylinder.

Figure 8:
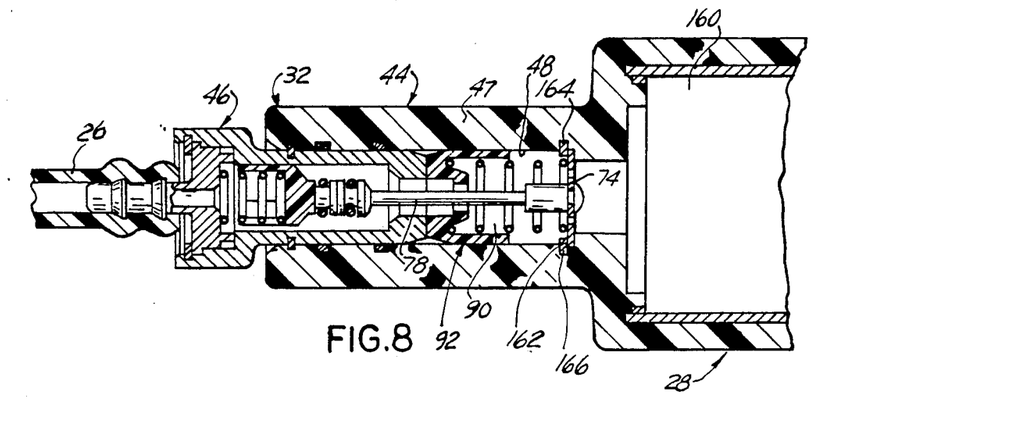
FIG. 8 is a partial section along line 8—8 of FIG. 4.

FIG. 8 illustrates an example of structure for connecting the end of the conduit 26 provided with a connector male member 46 to a master cylinder 28, the tubular body 47 of the connector female member 44 being formed integral with the housing of the master cylinder 28 which, in the example of structure illustrated, is made of plastic. The bore 160 of the master cylinder 28 is placed in direct communication with the female member bore 48. The perforated circular plate 74 supporting the rod 78 is mounted at the bottom of the bore 48 abutting against an annular shoulder 162 and held in position by a spring steel snap ring 164 engaged in an internal groove 166. The remaining of the structure illustrated at FIG. 8 is exactly the same as the structure of the leakproof quick-connect connector 32 previously described with more particular detail in reference to the structure illustrated at FIGS. 5-7.

Preferably, the male member tubular body 49 and the female body tubular body 47, FIGS. 5-6, and the end caps 52 are made of metal or metal alloys, such as steel or aluminum alloy for example. Preferably, the spider member 134 is made of a plastic molding and the cup-shaped valve spool 92 is also made of plastic. The rod 78 may be made of metal or plastic. However, it will be readily apparent that the tubular body members 49 and 47 may also be made of plastic, and in structures wherein one of the tubular member body is made integral with the master cylinder housing or the slave cylinder housing, it is evidently made of the same material as the cylinder housings themselves.

Whatever the structure adapted for particular applications, the hydraulic apparatus of the invention is conveniently prefilled with hydraulic fluid and pretested as described in detail in copending application Ser. No. 400,276, the two halves of the leakproof quick-connect connector 32 being coupled by means of an appropriate clamping mechanism, the interlocking ring 154 being omitted. After prefilling of the hydraulic apparatus with hydraulic fluid and testing, the two halves of the connector 32 are uncoupled, the ring 154 is installed in its groove 156 in the peripheral surface 50 of the male member tubular body 49, and the diverse components are shipped to a motor vehicle manufacturer, prefilled with hydraulic fluid, for installation on a motor vehicle.

Figure 9:
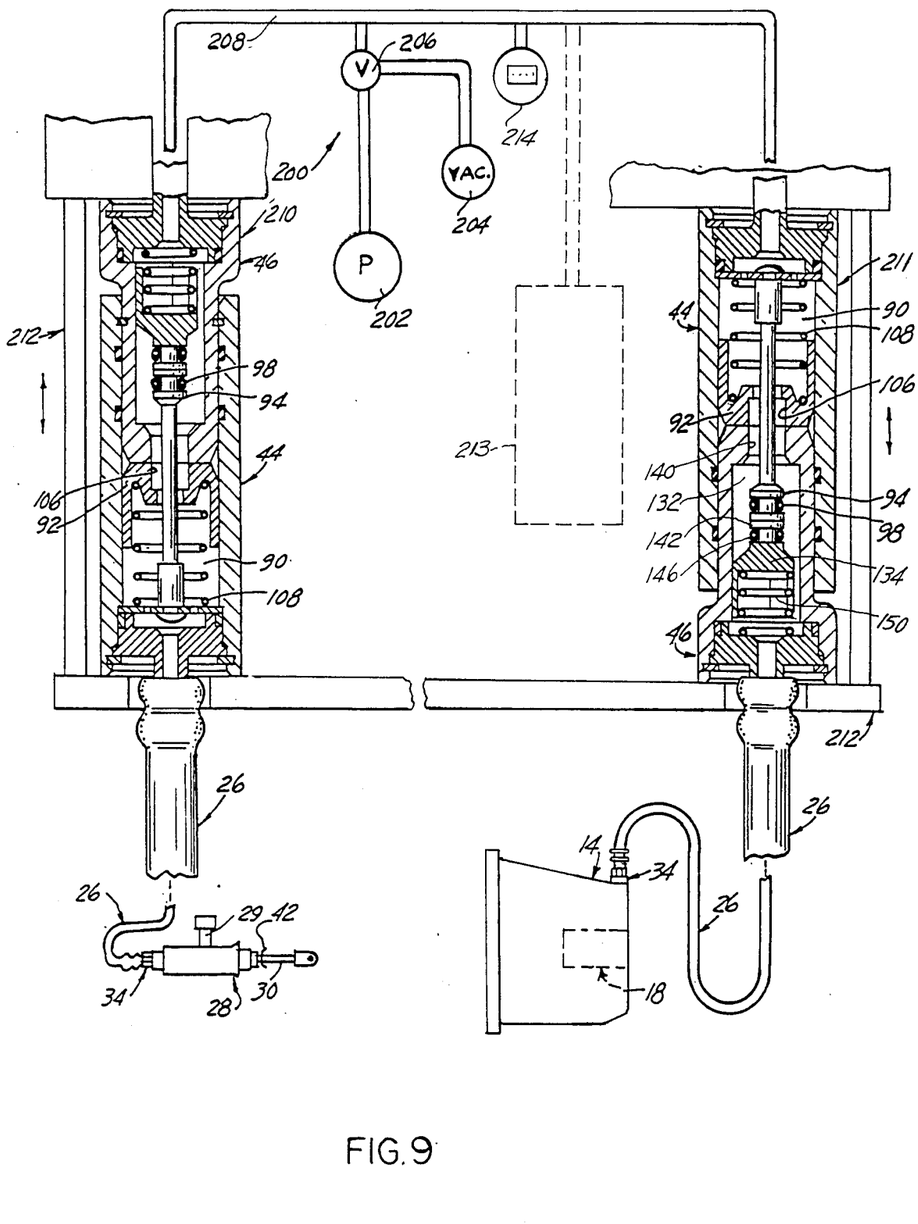
FIG. 9 is a partly schematic view illustrating the manner in which separate portions of the hydraulic control apparatus of the invention are simultaneously prefilled with hydraulic fluid.

Alternatively, and as illustrated schematically at FIG. 9, the diverse modular components of the hydraulic apparatus may be individually prefilled with hydraulic fluid. FIG. 9 illustrates an apparatus and method for prefilling the hydraulic apparatus of FIG. 3 in its two separate modular components, one consisting of the master cylinder 28 with a length of flexible conduit 26 already installed by means of a conventional connector 34 onto the master cylinder 28, the female member 44 of the leakproof quick-connect connector 32 being installed at the end of the length of flexible conduit 26, and a second length of flexible conduit 26 being connected by means of a conventional connector 34 to the slave cylinder 18 at one end and the other end being provided with the female member 46 of the quick-connect connector 32.

As illustrated at FIG. 9, the hydraulic fluid filling apparatus 200 comprises a supply of hydraulic fluid 202, and a source of suction or vacuum 204 both connectable through a three-way valve 206 to a line 208 having an appropriate fitting generally designated at 210 at one end, and another fitting generally designated at 211 at the other end. Although the fittings 210 and 211 may take any appropriate form that fits a complementary half of the connector 32, provided with appropriate means for opening the port of the half connector, it is readily apparent that for the sake of convenience the fitting 210 may actually be a male member 46 when it is desired to fill with hydraulic fluid the portion of the hydraulic apparatus terminated by a connector female member 44, and the fitting 211 may actually be a female member 44 where it is desired to couple the hydraulic fluid filling apparatus 200 to a portion of the hydraulic apparatus terminated by a connector male member 46.

The fitting 210 on one end of the line 208, taking the form of a connector male member 46, is coupled to the connector female member 44, on the end of the length of flexible conduit 26, by means of a clamping means 212, the resilient snap ring 154 (FIGS. 5-6) being omitted such that after the filling operation has been effected, and the clamping means 212 released, the fitting 210 is readily disconnected from the connector female member 44. The fitting 211, in the form of a connector female member 44, mounted on the other end of the line 208 of the filling apparatus 200, is also clamped, by means of the clamping means 212, in coupling engagement with the connector male member 47 on the end of the length of flexible conduit 26 connected to the slave cylinder 18.

In the clamped position illustrated in the drawing, the line 208 is in fluid communication, via the fitting 210 and connector female member 44, with the length of flexible line 26 which is in communication with the fluid chamber within the master cylinder 28, the fluid chamber within the master cylinder 28 being in fluid communication with the hydraulic fluid reservoir 29 in view of the extended position of the pushrod 30 as held by the clip 42 causing the piston, not shown, in the master cylinder 28 to be in a retracted position unmasking the port between the fluid chamber in the master cylinder and the reservoir 29. The line 208 is also in fluid communication with the length of flexible line 26 connected to the slave cylinder 18, via the fitting 211 and the connector male member 46. The valve 206 is switched to the position placing the vacuum source 204 in communication with the conduit 208 and, consequently with the master cylinder 28, via the fitting 210 and the connector female member 44 and, simultaneously, with the slave cylinder 18, via the fitting 211 and the connector male member 46, such as to simultaneously evacuate atmospheric air from both halves of the hydraulic apparatus. The test of the integrity of the whole hydraulic apparatus may be effected by maintaining the vacuum and switching the valve 206 to a closed position, and measuring the vacuum in the line 208 over a predetermined period of time by way of a gauge 214. Subsequently, the valve 206 is turned to a position placing the hydraulic fluid supply 202, preferably maintained at a pressure slightly higher than atmospheric pressure, in communication with the line 208 such as to fill both lengths of flexible conduit 26, the master cylinder 28, the fluid reservoir 29 and the slave cylinder 18 with hydraulic fluid, together with the chamber 90 within the connector female member 44 and the chamber 132 within the connector male member 46. As the clamping means 212 is released and the fitting 210 and connector female member 44 become progressively uncoupled, the spool valve 92 at the connector female member 46 is progressively displaced, under the action of the spring 108, in a direction that increases the volume of the fluid chamber 90, until the port defined by the bore 106 at the tip of the spool valve 92 is closed by the enlarged head 94, provided with the O-ring 98, as illustrated at FIG. 6 with respect to the connector female member 44. Simultaneously therewith, while the clamping means 212 is released, the fitting 211 and the connector male member 26 become progressively uncoupled, and the spider 134 of the connector male member 46 is displaced by the spring 150 in a direction that causes the chamber 132 to be cut off of the ambiant as a result of the spool 142 of the spider 134 provided with the O ring 146 being disposed within the bore 140, as illustrated at 66 with respect to the connector male member 46. It will be readily apparent to those skilled in the art that the filling apparatus 200 may be used with appropriate fixturing and clamping mechanisms for simultaneously evacuating, testing and filling any number of modular portions of a hydraulic apparatus provided with one half of a full quick-connect connector 32 at the master cylinder end of the conduit 26, FIG. 1, at the slave cylinder end of the conduit 26, FIG. 2, at some point between the ends of the conduit 26, FIG. 3, or at both ends of the conduit 26, FIG. 4.

The structure of FIG. 4 may also be filled with hydraulic fluid in the form of three separate modular units, one consisting of the slave cylinder 18, the other consisting of the master cylinder 28, and the third consisting of the conduit 26 on each end of which is mounted a half connector such as, for example, a connector male member 46, a connector female member 44, or a female member on one end and a male member on the other end. The filling and testing apparatus 200 is conveniently used in the same manner as previously described for the purpose of simultaneous filling the separate modular units, including the conduit 28, simply by adding a third appropriate fitting 213 connected to the line 208. The conduit 26 is individually filled by being first evacuated from atmospheric air, tested as to integrity if so desired, and subsequently filled with hydraulic fluid through one of the half connector members at one end of the conduit simultaneously with the master cylinder 28 and the slave cylinder 18. The half connector member at the other end of the conduit 26 remains closed during evacuation of the atmospheric air as long as the force of the spring 108, FIG. 6, urging the spool valve 92 to the position closing the connector female member 44, is high enough to overcome the atmospheric pressure applied on the end of the spool valve, in structures where a female member 44 is mounted on the free end or on both ends of the conduit 26, and as long as the force exerted by the spring 150 urging the spider member 154, in the connector male member 46, to a closed position is sufficient to overcome the atmospheric pressure applied to the frontal area of the end face 148 of the spool 142 on the end of the spider member, in structures having a connector male member 46 mounted on the free end of the conduit 26. For example, in a connector 32 according to the present invention having an overall diameter of about 24 mm. and an internal diameter of about 16 mm. for the bore 48 of the connector female member 44, all other dimensions of the elements being proportionally at the same scale, the coil spring 108 in the connector female member 44 needs to exert only a force of 1,800 grams, or 65 oz., and the coil spring 150 in the connector male member 46 needs to exert a force of only 300 grams, or 11 oz.

The leakproof quick-connect fitting or connector 32 heretofore described is of the one-way type. In other words, once the two halves of the connector, namely the female member 44 and the male member 46, are reconnected on a motor vehicle assembly line, for example, the internal locking between the members provided by the snap ring 154 being partially disposed in the groove 156 on the periphery of the male member tubular body 49 and in the groove 122 in the surface of the bore 48 of the female member tubular body 47, the male member 46 can no longer be uncoupled from within the female member 44. Such an arrangement preserves the integrity of the system and prevents tampering by unauthorized persons. However, because it presents the inconvenience that if one of the components requires repair or replacement, the whole apparatus must be replaced, especially in sealed units where no provisions are made for replenishing the supply of hydraulic fluid and for labeling the apparatus, and that, if work is to be effected on the motor vehicle engine, clutch or transmission, which requires removal of the affected component from the motor vehicle, the slave cylinder cannot be readily disconnected from the master cylinder. Such inconvenience is avoided by the modified connector structure disclosed in co-pending application Ser. No. 607,020 requiring the use of a special tool for disconnecting the two halves of the leakproof quick-connect connector 32. An example of such special tool is also disclosed in the co-pending application.

Other hydraulic apparatus, more particularly in the automotive field for example, and as also disclosed in detail for example in co-pending application Ser. No. 607,020 filed Aug. 30, 1984 and assigned to the same assignee as the present application, such as motor vehicle hydraulic brake systems, hydraulic throttle control apparatus, and hydraulic gear-shift apparatus, are conveniently assembled in the form of separate modular units, each provided with an appropriate leakproof quick-connect connector for reconnecting the diverse separate modular units after installing their components, by full sectional modular units, on a motor vehicle, on the manufacturer's assembly line. The separate modular units forming a complete system are conveniently evacuated from atmospheric air, tested and filled with hydraulic fluid, separately, or simultaneously, by means of the filling apparatus 200 and the clamping fixture 212 provided with as many fittings, 210, 211, 213 as necessary.

Having thus described the present invention by way of examples of structure well designed for practicing the method of the invention, modifications will be apparent to those skilled in the art, what is claimed as new is as follows:

1. A method of prefilling a hydraulic apparatus prior to shipment of said hydraulic apparatus to a user, said hydraulic apparatus comprising a master cylinder, a remote slave cylinder and a conduit connecting said master cylinder to said slave cylinder, said master cylinder, said slave cylinder and said conduit being supplied in the form of at least two separate modular units each capable of being coupled to the other by a leakproof connector having two interengageable complementary members having each a port providing fluid communication between said members when coupled together and means closing said ports when uncoupled, said method comprising simultaneously filling with hydraulic fluid each separate modular unit of said hydraulic apparatus provided with one of said complementary members, and providing said connector complementary members with one-way interlocking means preventing disconnect of said members after said members have been coupled by the user.

2. The method of claim 1 further comprising simultaneously evacuating atmospheric air from said modular units by connecting said modular units each through said connector complementary member to a source of vacuum prior to simultaneously filling said modular units with hydraulic fluid by connecting said modular units through said connector complementary member to a source of hydraulic fluid.

3. The method of claim 2 further comprising simultaneously testing the integrity of said modular units by monitoring pressure increase rate in said modular units after evacuating atmospheric air therefrom.

* * * * *